United States Patent [19]

Redder et al.

[11] 4,444,304

[45] Apr. 24, 1984

[54] SCRAPER CHAIN CONVEYOR CHANNEL SECTION

[75] Inventors: Manfred Redder, Bergkamen-Oberaden; Dieter Gründken; Volker Behm, both of Lunen, all of Fed. Rep. of Germany

[73] Assignee: Gewerkschaft Eisenhutte Westfalia, Lunen, Fed. Rep. of Germany

[21] Appl. No.: 276,718

[22] Filed: Jun. 23, 1981

[30] Foreign Application Priority Data

Jun. 26, 1980 [DE] Fed. Rep. of Germany ....... 3024460

[51] Int. Cl.$^3$ ............................................ B65G 19/28
[52] U.S. Cl. ..................................... 198/735; 198/861
[58] Field of Search ............................. 198/735, 861

[56] References Cited

U.S. PATENT DOCUMENTS

| 3,300,031 | 1/1967 | Dommann et al. | 198/861 |
| 4,074,804 | 2/1978 | Gründken et al. | 198/735 |
| 4,133,424 | 1/1979 | Sabes | 198/735 |
| 4,134,489 | 1/1979 | Sabes | 198/861 |

FOREIGN PATENT DOCUMENTS 1284918 12/1968 Fed. Rep. of Germany ...... 198/735
2060534 5/1981 United Kingdom ................ 198/735

*Primary Examiner*—Joseph E. Valenza
*Assistant Examiner*—Jonathan D. Holmes
*Attorney, Agent, or Firm*—Thompson, Birch, Gauthier & Samuels

[57] ABSTRACT

A channel section for a scraper-chain conveyor is constituted by a pair of sigma-shaped side walls, and a floor plate welded to the central flanges of the side walls. The sigma-shape of the side walls define V-shaped grooves in the side walls, each of these grooves being defined by a pair of outwardly-divergent inclined wall portions. Each end zone of each side wall is provided with a coupling element for coupling the channel section to an adjacent similar channel section. Each of the coupling elements is welded into a cut-away part formed at the adjacent end zone of the respective inclined wall portions. The coupling elements are provided with recesses for the reception of a connector such as a toggle bolt connector. Each of the side walls is provided with elongate stiffening members welded thereto adjacent to the upper and lower flanges respectively. The coupling elements protrude outwardly beyond their side walls as far as the outer edges of the stiffening members.

16 Claims, 8 Drawing Figures

SCRAPER CHAIN CONVEYOR CHANNEL SECTION

BACKGROUND TO THE INVENTION

This invention relates to a channel section for a scraper-chain conveyor.

Known scraper-chain conveyors, which are used primarily in underground mine workings, are constituted by a series of channel sections (or pans), which are connected together in an end-to-end relationship. The channel sections of one known type of scraper-chain conveyor have sigma-section side walls and a floor plate welded to the central portions of the side walls. Each of the side walls has inwardly-extending flanges at the top, the centre, and the base, the central flange being connected to the top and base flanges by means of a V-shaped wall section and by respective short vertical wall sections. The V-shaped wall sections define V-shaped grooves in the external surfaces of the side walls. The floor plate is welded to the central flanges of the sigma-shaped side walls.

A variety of devices for connecting the individual channel sections are known. Such devices normally resist tensile forces which tend to draw the ends of the channel sections apart; whilst permitting some angular mobility, in all directions, between the channel section ends. The connection devices are often subjected to very high forces during operation, not only the tensile forces which they are designed to resist, but also buckling forces tending to displace the conveyor ends laterally and/or vertically. Primarily, the lateral forces occur when the conveyor is advanced to follow up the mineral winning progress. This is usually accomplished by means of rams, which shift individual lengths of conveyor in a so-called "snaking" movement. The vertical forces usually occur when a mining machine supported on the conveyor is moved, for example, along the mineral face being won. Where the mine working is uneven, the lateral and vertical forces can increase substantially. Attachments, such as spill plates, and plough guides, are frequently bolted to the side walls of the channel sections. For this purpose, spill plate holders and guide plate holders are welded into the V-shaped grooves of the side walls.

One known way of connecting the individual channel sections of a scraper-chain conveyor is to provide interlocking coupling elements on the adjacent ends of each pair of adjacent channel sections. Each pair of interlocked coupling elements is connected together by means of screw bolts, so that the tensile forces can be transmitted between the channel section ends. The dimensions of the screw bolts that can be used for such connections are restricted by the dimensions of the V-shaped grooves in the channel section side walls. Unfortunately, this restriction on bolt size frequently results in the bolts being inadequate for the heavy loadings to which they are subjected. (see DE-OS No. 2 516 082).

It is also known to reinforce the side walls of the channel sections of a scraper-chain conveyor by welding stiffening members to the short vertical wall sections adjacent to the top and base flanges of the sigma-shaped side walls. The stiffening members lie flush with the top and base flanges, and also serve as backing members to which attachments such as spill plate holders and machine guides can be bolted. The stiffening members extend over substantially the entire length of the channel section side walls. Channel sections of this type are connected together by means of interlocking coupling elements and screw bolts. Here, the coupling elements are welded to the channel section side walls at the end portions thereof. The coupling elements also constitute stiffening members in these end portions where the longitudinal stiffening members are absent.

It is also known to join the interlocking coupling elements together by means of a toggle bolt (or dog-bone) connector. Such connector has an enlarged head at each end of a smooth shank. In this case, laterally-open recesses are provided in the coupling elements for receiving the connector. The connector is secured in place within the recesses in the coupling elements by means of removable retaining elements, such as C-shaped spring clips. Here again, the size of the connector is limited by the dimensions of the V-shaped grooves in the channel section side walls. Consequently, connections of this type may sometimes be inadequate to take up the heavy loadings which can occur. (see DE-OS No. 2 636 527).

The aim of the invention is to provide a scraper-chain conveyor channel section which does not suffer from the disadvantages of the known channel sections.

SUMMARY OF THE INVENTION

The present invention provides a channel section for a scraper-chain conveyor, the channel section comprising a pair of side walls and a floor plate extending between the side walls and connecting the side walls together, each of the side walls having a V-shaped groove extending longitudinally along the exterior surface thereof, each of the V-shaped grooves being defined by a pair of outwardly-divergent inclined wall portions, each end zone of each side wall being provided with a coupling element for coupling the channel section to an adjacent similar channel section, wherein each of the coupling elements is housed in a cut-away part formed at the adjacent end zone of the respective inclined wall portions.

Advantageously, each of the side walls has a generally sigma-shaped cross section which defines three vertically-spaced, inwardly-extending flanges, the central flange being joined to the upper and lower flanges by said inclined wall portions, and by respective short vertical wall sections. Conveniently, the floor plate is welded to the central flanges of the side walls. Preferably, the channel section further comprises elongate stiffening members attached to each of said short vertical wall sections of each of the side walls, the elongate stiffening members extending along substantially the entire length of the side walls. Each of the elongate stiffening members may be welded to its short vertical wall section, and each may lie flush with its respective upper or lower flange.

Preferably, each of the coupling elements protrudes outwardly beyond the profile of its side wall by approximately the thickness of the stiffening members attached to that side wall. Advantageously, each of the coupling elements is welded into its respective cut-away part, and each of the coupling elements is provided with an outwardly-open recessed portion for receiving part of a toggle bolt connector.

By welding the coupling elements into the cut-away parts at the ends of the side walls, a strong construction results without the upper and lower flanges of the side walls being affected. Moreover, the coupling elements can be larger and stronger than known coupling elements (as they can protrude out as far as the edges of the stiffening members), so they can accommodate larger and stronger connectors.

Advantageously, each of the coupling elements is generally V-shaped, the outwardly-divergent arms of which have a greater thickness than the adjacent outwardly-divergent wall portions of the side walls. Conveniently, each of the recessed portions is contiguous with the V-shaped groove in the associated side wall.

The coupling elements attached to each side wall may be formed with complementary end portions. Preferably, one of said end portions is provided with a projection, and the other of said end portions is provided with a complementary-shaped recess.

In a preferred embodiment, the stiffening members associated with each of the side walls are interconnected, at longitudinally-spaced locations, by transverse members. Conveniently, the transverse members are welded to the stiffening members, and the transverse members are positioned at the level of the V-shaped groove in the associated side wall. Advantageously, each of the transverse members is provided with a slot for receiving the shank of a bolt, and wherein each of the transverse members is provided, at the rear, with a socket for receiving a bolt head. Preferably, a respective transverse member is positioned adjacent to each coupling element, and wherein the aperture of each of said transverse members is provided with inclined guide surfaces for guiding the head of a bolt into the socket of that transverse member. Each of said transverse members may be formed with an aperture for receiving a securing element (such as a C-shaped spring clip) for the toggle bolt connector. Conveniently, each of said transverse members is of one-piece construction, and is welded to its associated coupling element.

Preferably, the stiffening members are formed with bolt holes, the bolt holes being of key-hole shape and being provided with enlargements at the rear for receiving the heads of bolts.

Advantageously, each of the stiffening members is substantially the same length as the channel section, and wherein the stiffening members of each side wall protrude beyond one end of that side wall and are set back relative to the other end of that side wall.

The invention also provides a scraper-chain conveyor comprising a plurality of channel sections joined together end-to-end, wherein each of the channel sections is as defined above. Preferably, the channel sections are connected together by means of toggle bolt connectors.

DESCRIPTION OF THE DRAWINGS

The invention will now be described in greater detail, by way of example, with reference to the accompanying drawings, in which.

DESCRIPTION OF PREFERRED EMBODIMENT

Figure 1:
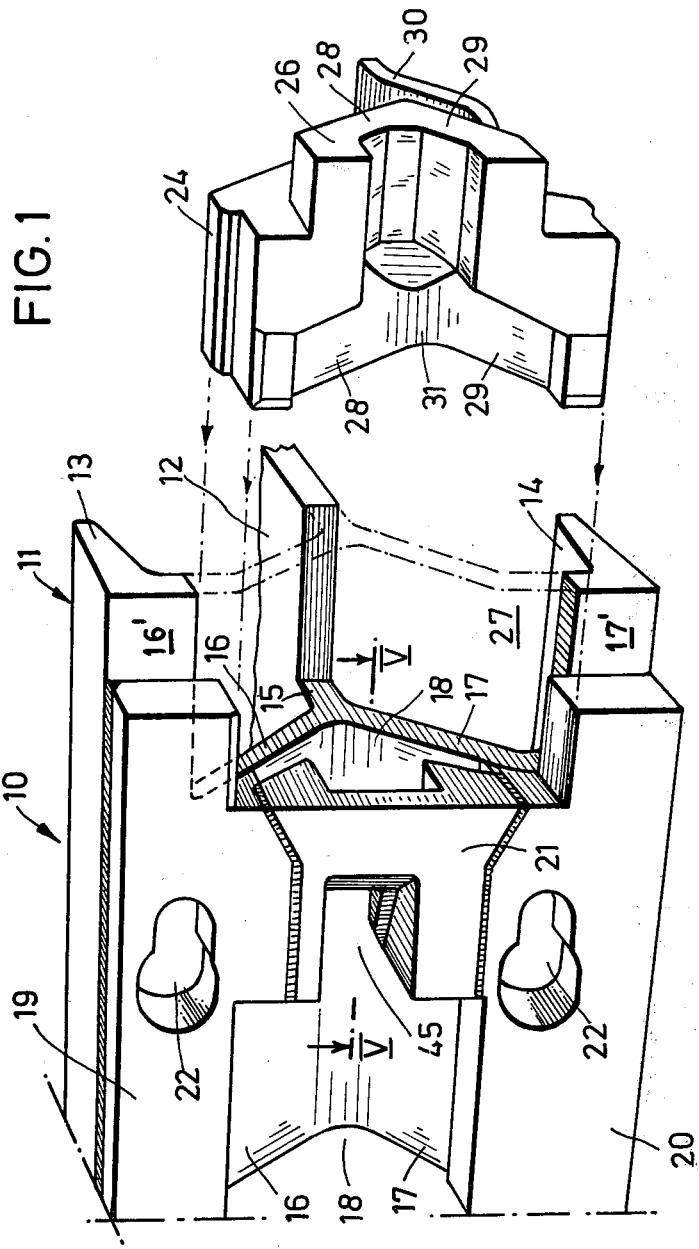
FIG. 1 is an exploded perspective view of one end of a scraper-chain conveyor channel section constructed in accordance with the invention.

Referring to the drawings, FIG. 1 shows one end portion of a channel section (or pan) 10 of a scraper-chain conveyor. The scraper-chain conveyor is constituted by a plurality of channel sections 10 joined together end-to-end. Each channel section 10 has a floor plate 12 welded between a pair of side walls 11. Each of the side walls 11 is a rolled steel member having a generally sigma-shaped cross-section. Thus, each side wall 11 has three inwardly-extending, horizontal flanges, namely a top flange 13, a base flange 14, and a central flange 15. The central flange 15 of each side wall 11 is joined to its top and base flanges 13 and 14 by means of outwardly-divergent walls 16 and 17 and short vertical walls 16' and 17'. The outwardly-divergent walls 16 and 17 of each side wall 11 define a V-shaped groove 18 which extends along the outside of that side wall. Elongate stiffening members 19 and 20 are welded to the short vertical walls 16' and 17' of each side wall 11; the stiffening members extending substantially the entire length of the channel section 10, and lying flush with the top and base flanges 13 and 14 respectively.

Each pair of elongate stiffening members 19 and 20 are interconnected, at spaced intervals, by transverse members in the form of shaped brackets or holders 21. FIG. 1 shows only one of these holders 21, namely that situated adjacent to the illustrated channel section end. The holders 21 are welded to their stiffening members 19 and 20, and are located within the associated V-shaped groove 18. The holders 21 enable attachments, such as spill plates and guide members, to be connected to the side walls 11 of the channel section 10.

Each of the elongate stiffening members 19 and 20 is provided with a series of longitudinally-spaced, key-hole shaped bolt apertures 22, each of which is provided with a socket 23 for the reception of a bolt head. Thus, bolts can be introduced into the widened portions of the apertures 22, and slid along these apertures until their heads engage within the sockets 23 formed in the rear surfaces of the stiffening members 19 and 20. These bolts can be used to assist with the fixing of attachments such as spill plates and guide members.

Figure 2:
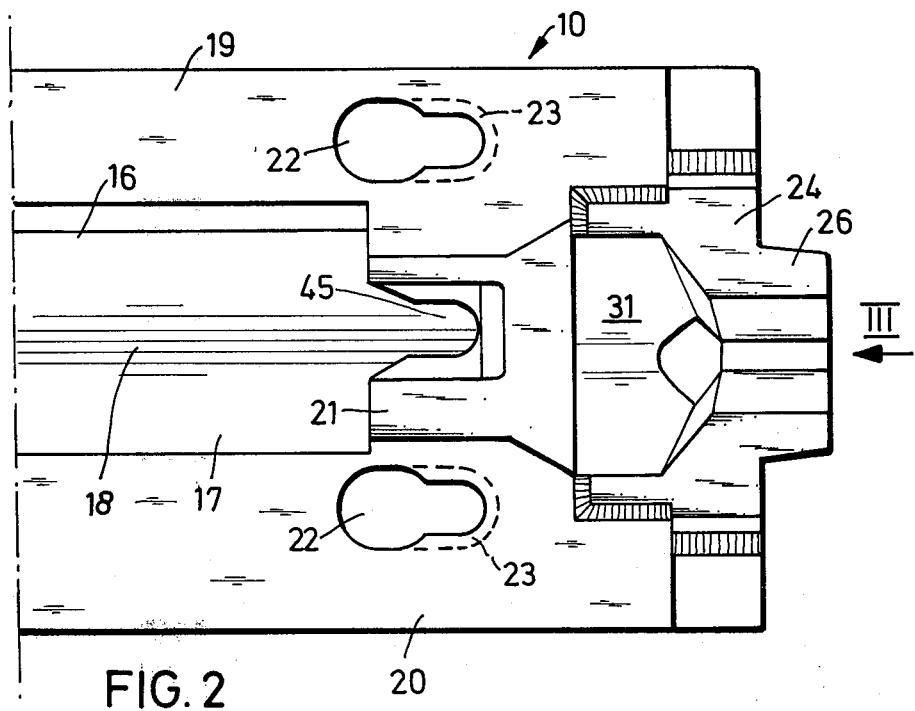
FIG. 2 is a side elevation of the channel section end portion shown in FIG. 1.
Figure 4:
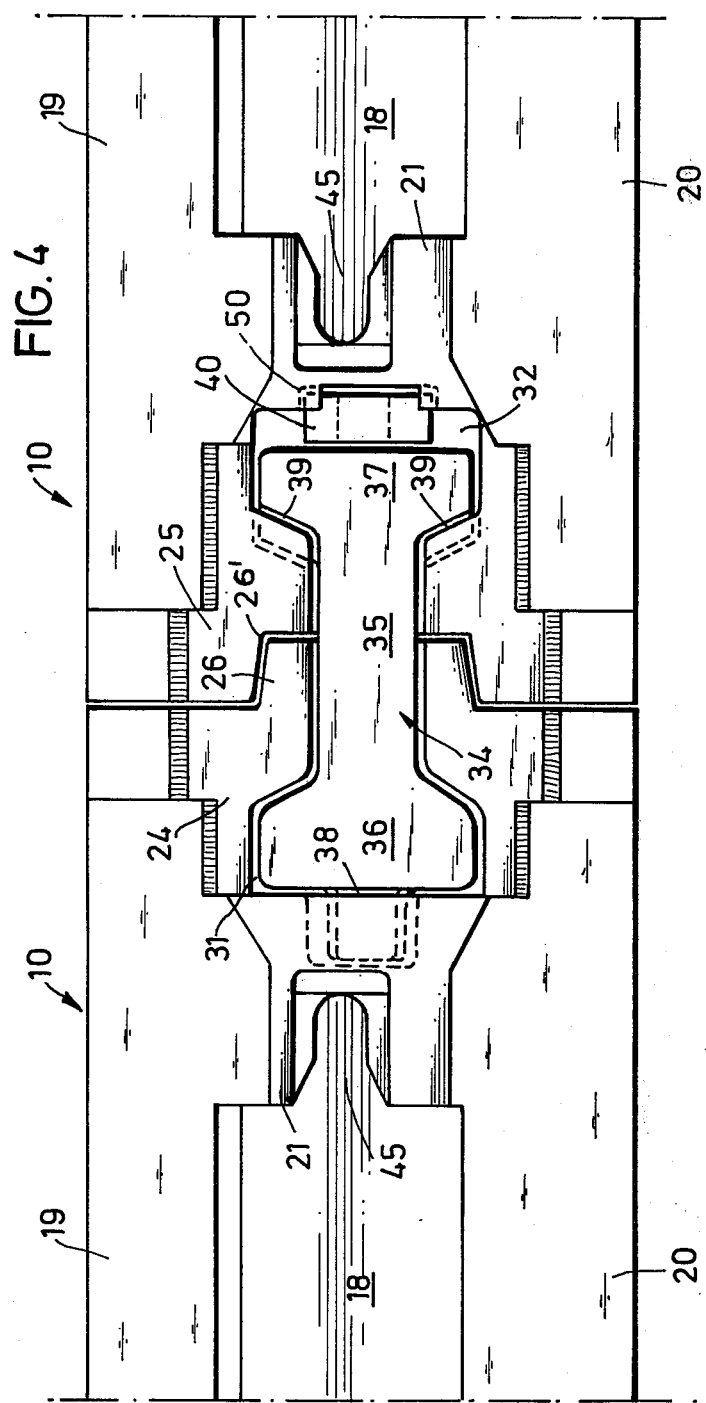
FIG. 4 is a side elevation of the channel section end portion, which is shown connected to a similar channel section end portion.

At the ends of each side wall 11, the channel sections 10 are provided with reinforced coupling elements 24 and 25 (FIGS. 1 and 2 show one only of these coupling elements—namely element 24—and FIG. 4 shows the elements 24 and 25 of two adjacent channel sections). Each of the coupling elements 24 and 25 is made of wear-resistant material and is welded to the adjacent end portion of the corresponding channel section side wall 11. As best seen in FIG. 4, each of the coupling elements 24 is provided with a projection 26 which mates, with an all-round clearance, with a recess 26' formed in the adjacent coupling element 25.

Each of the coupling elements 24 and 25 is welded into a cut-away portion 27 formed in the adjacent end zone of the divergent walls 16 and 17 (see FIG. 1). The cut-away portions 27 each remove a section of the end zone of the respective side wall 11, apart from the top flange 13, the base flange 14, and the upper and lower parts respectively of the vertical wall sections 16' and 17'. The coupling elements 24 and 25 can then be introduced into their cut-away portions 27 from the side (as indicated by the arrows shown in FIG. 1). Each of the coupling elements 24 and 25 is of a generally V-shaped configuration, having outwardly-divergent arms 28 and 29. As best seen by a comparison of FIGS. 3 and 8, the arms 28 and 29 are considerably thicker than the outwardly-divergent walls 16 and 17 of the side walls 11. Each coupling element 24 and 25 is provided with an inwardly-extending curved flange 30, which is welded to the floor plate 12.

The coupling elements 24 and 25 are formed with outwardly-open recesses 31 and 32 respectively. These recesses 31 and 32 are shaped to receive a toggle bolt (dog-bone) connector 34 (see FIG. 4). The connectors 33 have a central smooth shank 35 of generally triangular cross-section. Enlarged heads 36 and 37 are formed at the two ends of the shank 35 of each connector 34. Each head 36 is provided with an axially-extending fastening member 38, which engages within a complementary recess (see FIG. 4) formed in the adjacent holder 21, so as to lock the connector 34 to the left-hand channel section 10 (as seen in FIG. 4). The other head 37 of each connector 34 is provided with shoulders 39 which engage behind complementary recesses formed in the associated coupling element 25. Thus, each of the connectors 34 is prevented from falling laterally out of its recesses 31 and 32 by means of its fastening member 38 and its shoulders 39. A respective C-shaped spring clip 40 (see FIG. 4) is provided for preventing each connector 34 from moving axially, the clips 40 being inserted into their recesses 32 from the outside. Each clip 40 is held in place within a socket formed in the corresponding holder 21.

Figure 3:
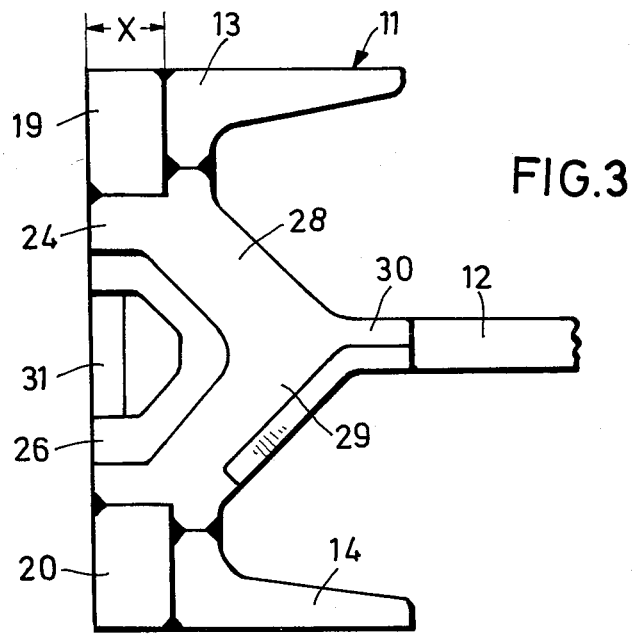
FIG. 3 is an end view, looking in the direction of the arrow III of FIG. 2, of the channel section end portion.

As best seen from FIG. 3, each of the coupling elements 24,25 protrudes outwardly with respect to its side wall 11 by a distance X which corresponds substantially to the thickness of the stiffening members 19 and 20 associated with that side wall. Thus, the external surfaces of the coupling elements 24 and 25 lie substantially flush with the external surfaces of the corresponding stiffening members 19 and 20. Moreover, as shown best in FIG. 1, each of the recesses 31 is contiguous with the adjacent V-shaped groove 18. Similarly, the recesses 32 are contiguous with the V-shaped grooves 18. Accordingly, the recesses 31 and 32 each have a comparatively large cross-section, so that they can accommodate connectors 34 of a correspondingly large cross-section. In other words, the channel sections 10 can be connected together by connectors 34 which are larger (and therefore stronger) than known connectors. Consequently, the channel section 10 can be connected together in a more reliable manner than was possible with prior art arrangements.

Figure 5:
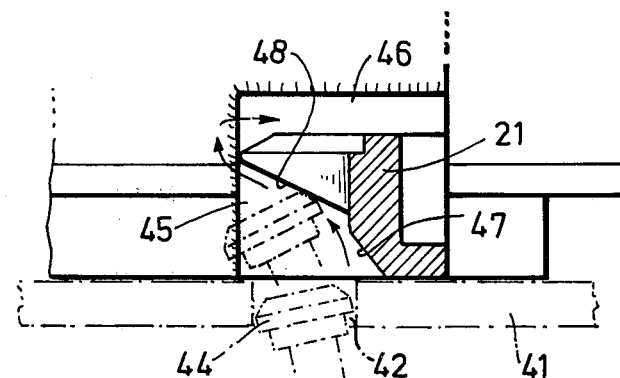
FIGS. 5 and 6 are each cross-sections taken on the line V—V of FIG. 1, and show how a bolt is introduced to fix a holder to the channel section.
Figure 6:
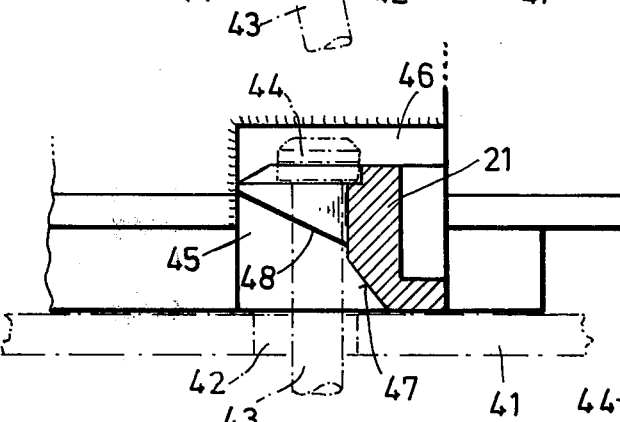
Figure 7:
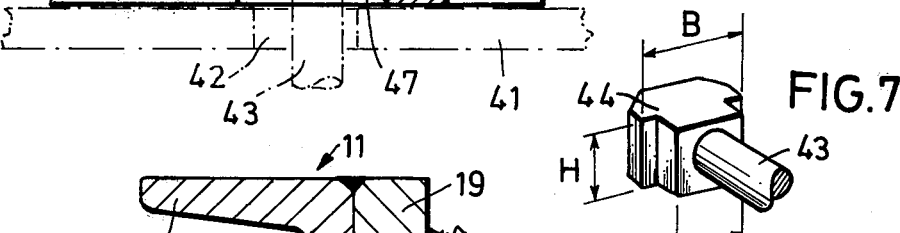
FIG. 7 is a perspective view of the head of the bolt shown in FIGS. 5 and 6.
Figure 8:
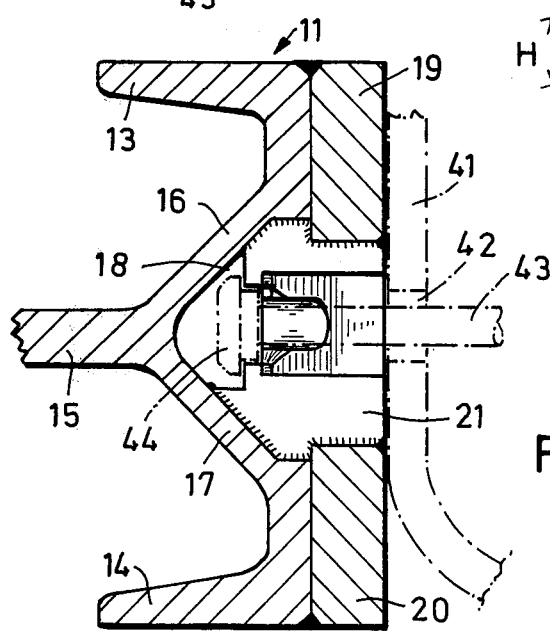
FIG. 8 is a transverse cross-section through one side wall of the channel section, and shows a holder attached thereto.

As mentioned above, attachments can be secured to the side walls 11, using threaded bolts, the holders 21, and the stiffening members 19 and 20. For example, FIGS. 5, 6 and 8 show the attachment of a guide rail 41 (shown in dash-dot lines). The guide rail 41 constitutes a lower guide member for a plough which is reciprocable along the conveyor. The guide rail 41 is provided with horizontal elongate slots 42, through which bolts 43 extend to connect the guide rail to the holders 21. Each of the bolts 43 (see FIG. 7) has a stepped head 44, whose width B is greater than its height H, and which has a narrower inwardly-stepped portion of width A. Each of the holders has a slot 45 and a socket 46 for receiving a bolt 43.

Each of the holders 21 positioned adjacent to an end of a side wall 11 is welded between the corresponding stiffening members 19 and 20 in such a way that its slot 45 opens out towards the centre of that side wall. Thus, a bolt 43 can be introduced into the slot 45 from the side, and then slid along so its head 44 lies in the socket 46. To facilitate the introduction of a bolt 43, each end holder 21 is formed with inclined guide surfaces 47 and 48, these surfaces being effective to guide the bolt head 44 into the socket 46 (see FIGS. 5 and 6). Thus, as shown in FIG. 5, the bolt 43 is introduced through the slot 42, and into the slot 45, in an oblique position. When the head 44 abuts the guide surfaces 47 and 48, the bolt 43 is pivoted (as indicated by the arrows in FIG. 5), and rotated about its axis, so that the head 44 moves into the socket 46 (see FIG. 6). The bolt 43 then lies perpendicular to the side wall 11, so that the guide rail 41 can be fixed thereto by screwing a nut onto the threaded end portion of the bolt. Obviously, the guide rail 41 is also fixed to the side wall 11 by means of nuts and bolts associated with the stiffening members 19 and 20.

The stiffening members 19 and 20 are welded to the side wall sections 16' and 17' so that they protrude slightly beyond one end of the respective side wall 11, and so that they are set back slightly relative to the other end (as shown in FIG. 1). Thus, when the channel sections 10 are connected together, the protruding stiffening members 19 and 20 of one channel section side wall engage within the apertures formed by the set back stiffening members of the adjacent side wall. This results in an improved form of connection.

We claim:

1. A channel section for a scraper-chain conveyor, the channel section comprising a pair of side walls and a floor plate extending between the side walls and connecting the side walls together, each of the side walls having a generally sigma-shaped cross section defining a V-shaped groove extending longitudinally along the exterior surface thereof and three vertically-spaced inwardly-extending flanges, the central flange being joined to the upper and lower flanges by a pair of outwardly-divergent inclined wall portions and by respective short vertical wall sections, each of the side walls having elongate stiffening members extending substantially the entire length thereof and attached to said short vertical wall sections, each end zone of each side wall being provided with a coupling element for coupling the channel section to an adjacent similar channel section, each of the coupling elements being housed in a cut-away part formed at the adjacent end zone of the respective inclined wall portions and being shaped to protrude outwardly beyond the profile of its side wall by approximately the thickness of the stiffening members attached to that side wall, the stiffening members associated with each of the side walls being interconnected at longitudinally spaced intervals adjacent to each coupling element, by transverse members which are positioned at the level of the V-shaped groove in the associated side wall and which are welded to the stiffening members, each transverse member being provided with a slot for receiving the shank of a bolt, with a socket at its rear for receiving a bolt head, and with an aperture with inclined guide surfaces for guiding the head of a bolt into said socket.

2. A channel section according to claim 1, wherein the floor plate is welded to the central flanges of the side walls.

3. A channel section according to claim 1, wherein each of the elongate stiffening members is welded to its short vertical wall section.

4. A channel section according to claim 1, wherein each of the stiffening members lies flush with its respective upper or lower flange.

5. A channel section according to claim 1, wherein each of the coupling elements is welded into its respective cut-away part.

6. A channel section according to claim 1, wherein each of the coupling elements is provided with an outwardly-open recessed portion for receiving part of a toggle bolt connector.

7. A channel section according to claim 6, wherein each of the coupling elements is generally V-shaped, the outwardly-divergent arms of which have a greater thickness than the adjacent outwardly-divergent wall portions of the side walls.

8. A channel section according to claim 7, wherein each of the recessed portions is contiguous with the V-shaped groove in the associated side wall.

9. A channel section according to claim 1, wherein the coupling elements attached to each side wall are formed with complementary end portions.

10. A channel section according to claim 9, wherein one of said end portions is provided with a projection, and the other of said end portions is provided with a complementary-shaped recess.

11. A channel section according to claim 1, wherein each of said transverse members is formed with an aperture for receiving a securing element for a toggle bolt connector.

12. A channel section according to claim 1, wherein each of said transverse members is of one-piece construction, and is welded to its associated coupling element.

13. A channel section according to claim 1, wherein the stiffening members are formed with bolt holes, the bolt holes being of key-hole shape and being provided with enlargements at the rear for receiving the heads of bolts.

14. A channel section according to claim 1, wherein each of the stiffening members is substantially the same length as the channel section, and wherein the stiffening members of each side wall protrude beyond one end of that side wall and are set back relative to the other end of that side wall.

15. A scraper-chain conveyor comprising a plurality of channel sections joined together end-to-end, each of the channel sections comprising a pair of side walls and a floor plate extending between the side walls and connecting the side walls together, each of the side walls having a generally sigma-shaped cross section defining a V-shaped groove extending longitudinally along the exterior surface thereof and three vertically-spaced inwardly extending flanges, the central flange being joined to the upper and lower flanges by a pair of outwardly-divergent inclined wall portions and by respective short vertical wall sections, each of the side walls having elongate stiffening members extending substantially the entire length thereof and attached to said short vertical wall sections, each end zone of each side wall being provided with a coupling element for coupling the channel section to an adjacent channel section, each of the coupling elements being housed in a cut-away part formed at the adjacent end zone of the respective inclined wall portions and being shaped to protrude outwardly beyond the profile of its side wall by approximately the thickness of the stiffening members attached to that side wall, the stiffening members associated with each of the side walls being interconnected at longitudinally spaced intervals adjacent to each coupling element, by transverse members which are positioned at the level of the V-shaped groove in the associated side wall and which are welded to the stiffening members, each transverse member being provided with a slot for receiving the shank of a bolt, with a socket at its rear for receiving a bolt head, and with an aperture with inclined guide surfaces for guiding the head of a bolt into said socket.

16. A scraper-chain conveyor according to claim 15, wherein the channel sections are connected together by means of toggle bolt connectors.

* * * * *